United States Patent
Cohee

(10) Patent No.: US 6,612,360 B1
(45) Date of Patent: Sep. 2, 2003

(54) ASSEMBLY FOR ATTACHING FABRIC TO METAL AND METHOD OF FABRICATION THEREFOR

(75) Inventor: Donald R. Cohee, Felton, DE (US)

(73) Assignee: ILC Dover, Inc., Frederica, DE (US)

( * ) Notice: Subject to any disclaimer, the term of this patent is extended or adjusted under 35 U.S.C. 154(b) by 0 days.

(21) Appl. No.: 09/589,771

(22) Filed: Jun. 9, 2000

Related U.S. Application Data

(60) Provisional application No. 60/138,536, filed on Jun. 10, 1999.

(51) Int. Cl.⁷ .................. B22D 19/00; B29C 65/00; D03D 25/00
(52) U.S. Cl. .................. 164/98; 264/257; 264/259; 442/228; 403/265
(58) Field of Search .................. 164/98, 91, 111, 164/112, 332, 333, 334; 249/83; 264/257, 259, 261, 267, 271.1, 274, 275, 318, 103; 2/2.11, 2.15; 403/265, 268, 269; 442/228, 232, 377, 378; 428/67, 608

(56) References Cited

U.S. PATENT DOCUMENTS

| | | | | |
|---|---|---|---|---|
| 2,255,184 A | * | 9/1941 | Osenberg | 18/59 |
| 2,824,595 A | * | 2/1958 | Lehre | 156/66 |
| 3,650,647 A | * | 3/1972 | Jacobs et al. | 425/500 |
| 3,713,936 A | * | 1/1973 | Ramsay, Jr. | 156/242 |
| 3,998,922 A | * | 12/1976 | Weiss | 264/255 |
| 4,030,953 A | * | 6/1977 | Rutschow et al. | 156/79 |
| 4,186,235 A | * | 1/1980 | Bramwell | 428/286 |
| 4,332,548 A | * | 6/1982 | Linton et al. | 431/289 |
| 4,357,193 A | * | 11/1982 | McGann et al. | 156/286 |
| 4,508,158 A | * | 4/1985 | Amateau et al. | 164/110 |
| 4,573,517 A | * | 3/1986 | Booth et al. | 164/61 |
| 4,673,150 A | * | 6/1987 | McSherry et al. | 248/73 |
| 4,735,753 A | * | 4/1988 | Ackermann | 264/23 |
| 4,839,215 A | * | 6/1989 | Starling et al. | 428/131 |
| 5,275,548 A | * | 1/1994 | Tibiletti | 425/129.1 |
| 5,370,921 A | * | 12/1994 | Cedarleaf | 428/138 |
| 5,476,627 A | * | 12/1995 | Black | 264/134 |
| 5,511,604 A | * | 4/1996 | Ravenhall et al. | 164/97 |
| 5,570,502 A | * | 11/1996 | Sawtell et al. | 29/527.6 |
| 5,632,320 A | * | 5/1997 | Atmur et al. | 164/98 |
| 5,662,157 A | * | 9/1997 | Cook | 164/97 |
| 5,842,850 A | * | 12/1998 | Pappas | 431/291 |
| 5,932,496 A | * | 8/1999 | Morris et al. | 442/238 |
| 5,939,005 A | * | 8/1999 | Materna | 264/255 |
| 5,967,769 A | * | 10/1999 | Thompson | 431/288 |
| 6,004,662 A | * | 12/1999 | Buckley | 428/304.4 |
| 6,096,251 A | * | 8/2000 | D'Hooren | 264/163 |
| 6,221,795 B1 | * | 4/2001 | Sikorski et al. | 442/19 |

* cited by examiner

Primary Examiner—M. Alexandra Elve
Assistant Examiner—Kevin P. Kerns
(74) Attorney, Agent, or Firm—Stevens, Davis, Miller & Mosher, L.L.P.

(57) ABSTRACT

A product having a metal-fabric joint includes forming a fabric anchoring component by casting a low melting point yet high compressive strength material into a cavity in a metal component. The product includes (a) a metal housing including an interior entrance, at least first and second opposed interior walls, and an interior end opposite the interior entrance, the at least first and second opposed interior walls and the interior end defining an interior cavity; (b) a fabric; (c) a fabric anchor assembly; and (d) a castable material disposed in the interior cavity so as to envelop the fabric and the fabric anchor assembly. A method of fabricating the product includes the steps of (a) anchoring the fabric with the fabric anchor assembly; (b) inserting the anchored fabric in the interior cavity; (c) providing the interior cavity with the castable material so as to envelop the anchored fabric; and (d) solidifying the castable material to a cast material so as to form the product. Advantages associated with the product include not only its simplicity, compact size, and light weight, but the requisite mechanical integrity of the resulting attachment. In addition, by using a low melting point material for the castable material, the product can be easily disassembled for repair or replacement of components by simply melting the castable material out of the interior cavity.

16 Claims, 1 Drawing Sheet

ASSEMBLY FOR ATTACHING FABRIC TO METAL AND METHOD OF FABRICATION THEREFOR

This application claims the priority of U.S. Provisional Application No. 60/138,536 filed Jun. 10, 1999, and incorporated herein by reference.

BACKGROUND OF THE INVENTION

1. Field of the Invention

This invention relates generally to a method of and apparatus for attaching a fabric component to a metal component. The invention relates more specifically to a means for anchoring the fabric component by casting a low melting point yet high compressive strength material into a cavity in the metal component.

2. Description of Related Art

In the design of full pressure suits such as space suits, fabric components have traditionally been attached to metal components (e.g., bearings, sizing rings, and transition sections) by capturing the fabric under a flange mounted retainer ring using machine screws and seals, such as the conventional technique depicted in FIG. 1.

The fabric component 10 is fabricated with a mounting flange 20 terminating in a "deadman" 30 so as to prevent material pullout. Bolt holes 21 are located and punched in the metal mounting flange 20. A metal clamping ring 40 is fabricated with the same hole pattern 41 as that of the flange. In addition, an O-ring seal groove 22 is machined to accommodate O-ring seal 23. The fabric component 10 is then flange mounted to the metal component 20 by means of the bolts 50.

Disadvantages associated with the conventional technique, however, include both the amount of space occupied by the flange section, and the weight of the overall assembly.

SUMMARY OF THE INVENTION

It is an object of the present invention to provide a means for attaching a fabric component to a metal component which is both relatively compact and lightweight, yet which also provides the requisite secure attachment between the components.

Accordingly, in a first preferred embodiment the present invention advantageously relates to a means for anchoring the fabric component by casting a low melting point yet high compressive strength material into a cavity in the metal component.

In a typical embodiment, the assembly for attaching fabric to metal comprises (a) a metal housing comprising an interior entrance, at least first and second opposed interior walls, and an interior end opposite the interior entrance, the at least first and second opposed interior walls and the interior end defining an interior cavity; (b) a fabric; (c) a fabric anchor assembly; and (d) a castable material disposed in the interior cavity so as to envelop the fabric and the fabric anchor assembly.

More specifically, the assembly for attaching comprises a metal housing comprising an undercut, e.g., a dovetail-shaped, cavity at the fabric/metal attachment interface, fabric, anchor, stitching, and castable material.

In a second preferred embodiment of the assembly for attaching, the walls of the cavity are coated with a rigid thermoplastic adhesive so as to provide for adhesion of the castable material to the walls.

In a third preferred embodiment of the assembly for attaching, a flexible sealant is disposed in a portion of cavity between the castable material and a first end of the cavity. This flexible sealant serves as a transition section to reduce the stress concentration of the fabric at the fabric/metal interface.

In a fourth preferred embodiment of the assembly for attaching, a bladder layer is disposed so as to be contiguous with the fabric component.

The invention further relates to a method of fabricating the aforementioned assembly for attaching fabric to metal. In a typical embodiment, the method comprises the steps of (a) anchoring the fabric with the fabric anchor assembly; (b) inserting the anchored fabric in the interior cavity; (c) providing the interior cavity with the castable material so as to envelop the anchored fabric; and (d) solidifying the castable material to a cast material so as to provide the assembly for attaching.

Advantages associated with the assembly for attaching include not only its simplicity, compact size, and light weight, but the requisite mechanical integrity of the resulting attachment. In addition, by using a low melting point material for the castable material, the assembly can be easily disassembled for repair or replacement of components by simply melting the castable material out of the interior cavity.

BRIEF DESCRIPTION OF THE DRAWINGS

Other objects, features, and advantages of the present invention will become more fully apparent from the following detailed description of the preferred embodiments and the accompanying drawings. As depicted in the attached drawings.

DESCRIPTION OF THE PREFERRED EMBODIMENTS

The present invention will be disclosed in terms of the currently perceived preferred embodiments thereof.

The present invention provides a means for attaching a fabric component to a metal component which is both relatively compact and lightweight, yet which also provides the requisite secure attachment between the components.

Accordingly, in a first preferred embodiment the present invention advantageously relates to a means for anchoring the fabric component by casting a low melting point yet high compressive strength material into a cavity in the metal component.

Figure 2:
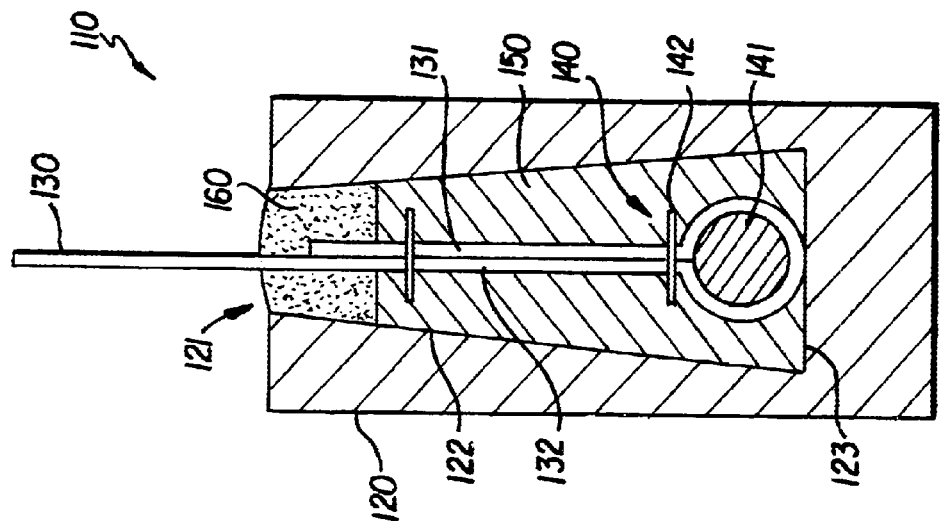
FIG. 2 is a sectional view of an assembly for attaching a fabric component to a metal component according to a first preferred embodiment of the present invention.
Figure 1:
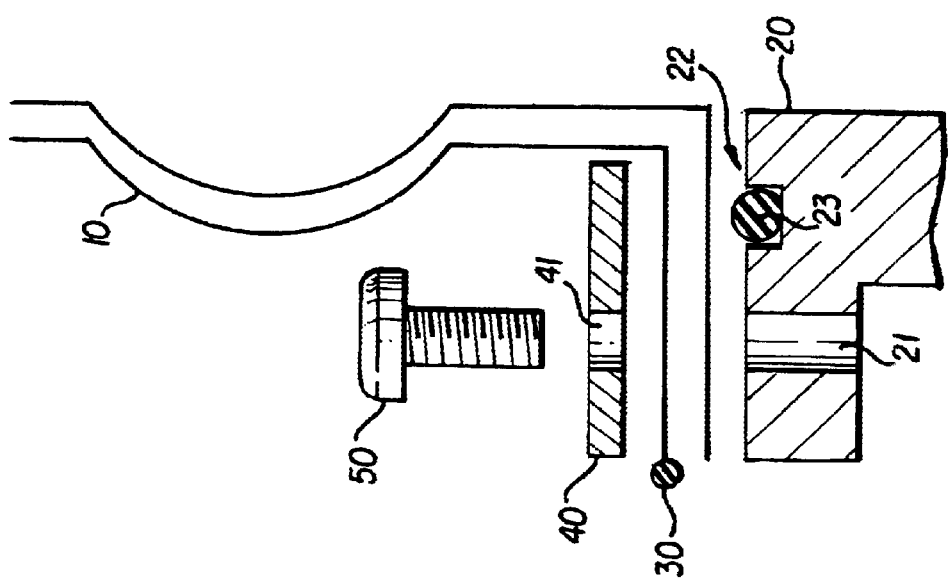
FIG. 1 is an exploded sectional view of a prior art means for attaching a fabric component to a metal component.

Referring to FIG. 2, in the first preferred embodiment, the assembly 110 for attaching fabric to metal comprises (a) a metal housing 120 comprising an interior entrance 121, at least first and second opposed interior walls 122, and an interior end 123 opposite the interior entrance 121, the at least first and second opposed interior walls 122 and the interior end 123 defining an interior cavity; (b) a fabric 130; (c) a fabric anchor assembly 140; and (d) a castable material 150 disposed in the interior cavity so as to envelop the fabric 130 and the fabric anchor assembly 140.

In a typical embodiment, fabric 130 comprises a first fabric portion 131 and a second fabric portion 132, and fabric anchor assembly 140 comprises an anchor 141 and a means for attaching fabric 130 to anchor 141, such as, for example, stitching 142. Anchor 141 is preferably of a construction which does not contain voids (which can lead to compression of the anchor), and therefore is typically a monofilament, a cable, or a wire.

More specifically, again referring to FIG. 2, in a typical embodiment the attachment assembly 110 comprises a metal housing 120 comprising an undercut, e.g., a dovetail-shaped, cavity at the fabric/metal attachment interface (i.e., that portion of the assembly adjacent to interior entrance 121), fabric 130 comprising first fabric portion 131 and second fabric portion 132, anchor 141, stitching 142, and castable material 150.

Castable material 150 is a high compressive strength material. Polymeric materials, including both thermoplastic and thermosetting types, are suitable for use as the castable material. In a service in which the possibility of disassembly of the components is desired, the material should typically be one which has a relatively low melting point, e.g., thermoplastic polymeric materials and low melting point metal alloys. For example, the thermoplastic polymeric material could be a hot melt adhesive, and the low melting point metal alloy could be a low melting point solder alloy. Such thermoplastic polymeric materials and low melting point metal alloys are preferred insofar as they can be easily removed to facilitate disassembly of the components.

By using such a low melting point material for the castable material, assembly 110 can be easily disassembled for repair or replacement of components by simply melting castable material 150 out of the interior cavity.

Optionally, in a service in which a permanent attachment is desired, the fabric and fabric anchor assembly can be locked in place by filling the interior cavity with a thermoset material, such as, for example, an epoxy.

In a second preferred embodiment of the assembly for attaching, the assembly further comprises a coating of rigidized thermoplastic adhesive disposed on each of first and second opposed interior walls 122 of metal housing 120. Walls 122 are coated with a rigid thermoplastic adhesive compatible with the hot melt adhesive and/or low melting point solder alloy so as to provide for adhesion of castable material 150 to the walls 122. This embodiment provides for a level of structural and leakage integrity even beyond that afforded by the mechanical locking action of the castable material in the cavity.

In a third preferred embodiment of the assembly for attaching, the assembly further comprises a flexible sealant 160 disposed in a portion of the interior cavity located between castable material 150 and interior entrance 121. This flexible sealant serves as a transition section to reduce the stress concentration of the fabric at the fabric/metal interface.

In a fourth preferred embodiment of the assembly for attaching, the assembly further comprises a bladder layer disposed so as to be contiguous with fabric 130. The bladder layer thus contacts the hot melt adhesive and/or low melting point solder alloy so as to improve adhesion.

The invention further relates to a method of fabricating assembly 110 for attaching fabric to metal. In a first preferred embodiment, the method comprises the steps of (a) anchoring fabric 130 with fabric anchor assembly 140; (b) inserting the anchored fabric in the interior cavity; (c) providing the interior cavity with the castable material 150 so as to envelop the anchored fabric; and (d) solidifying the castable material to a cast material so as to provide the assembly 110.

In a typical embodiment, the method of fabricating assembly 110 comprises the steps of (a) folding first fabric portion 131 over anchor 141, and folding folded first fabric portion 131 back against second fabric portion 132; (b) attaching folded first fabric portion 131 to second fabric portion 132 with the means for attaching so as to provide an anchored fabric; (c) inserting the anchored fabric in the interior cavity; (d) providing the interior cavity with castable material 150 so as to envelop the anchored fabric; and (e) solidifying castable material 150 to a cast material so as to provide assembly 110.

More specifically, again referring to FIG. 2, preliminarily an undercut interior cavity, e.g., a dovetail-shaped cavity having a first end and a second end is provided in metal housing 120 by a method such as machining. The cross section of the cavity can be made to follow the contour of the fabric/metal interface (e.g., circular, cylindrical, or any other desired shape).

Next, fabric anchor assembly 140 (sometimes generically referred to as a "deadman") is fabricated by folding first fabric portion 131 of fabric 130 over anchor 141 (which is, typically, the aforementioned monofilament, cable, or wire), and then folding first fabric portion 131 back against second fabric portion 132. First fabric portion 131 and second fabric portion 132 are then attached to one another by a suitable means for attaching, such as, for example, stitching 142.

To facilitate the insertion of fabric anchor assembly 140 into the interior cavity, interior entrance 121 of metal housing 120 has a width that is slightly larger than the diameter of fabric anchor assembly 140.

Once fabric 130 and fabric anchor assembly 140 (i.e., the "anchored fabric") have been placed in the portion of the cavity generally adjacent to interior end 123, castable material 150 is provided within the cavity so as to envelop fabric 130 and fabric anchor assembly 140. Castable material 150 is then solidified to form a cast material, so as to mechanically lock fabric 130 and fabric anchor assembly 140 in place, and thus provide assembly 110.

In a second embodiment of the method of fabricating the assembly for attaching, the method further comprises after step (a) and before step (b) a step of providing a coating of rigidizable thermoplastic adhesive disposed on each of the first and second opposed interior walls 122.

In a third embodiment of the method of fabricating the assembly for attaching, the method further comprises after step (c) and before step (d) a step of providing a flexible sealant 160 disposed in a portion of the interior cavity located between castable material 150 and interior entrance 121.

In a fourth embodiment of the method of fabricating the assembly for attaching, the method further comprises after step (b) and before step (c) a step of providing a bladder layer disposed so as to be contiguous with the fabric 130.

The present invention, therefore, provides a means for anchoring a fabric component by casting a low melting point yet high compressive strength material into a cavity in a metal component. Advantages associated with the invention include not only its compact size and light weight, but the requisite mechanical integrity of the resulting attachment. In addition, by using a low melting point material for the castable material, the assembly can be easily disassembled for repair or replacement of components by simply melting the castable material out of the interior cavity.

While only certain preferred embodiments of this invention have been shown and described by way of illustration, many modifications will occur to those skilled in the art. For example, while the attachment assembly has been described in one embodiment in the context of a pressure suit application, its use is equally applicable to any service which requires a secure but relatively compact and lightweight attachment between fabric and metal components.

By way of further example of modifications within the scope of this invention, while the cavity has been described in a first preferred embodiment as being dovetail-shaped, another embodiment could comprise any geometry which provides both the requisite access to the anchoring means and the mechanical locking of the castable material.

By way of further example of modifications within the scope of this invention, while the assembly for attaching has been described in a first preferred embodiment as comprising a single fabric and a single fabric anchor assembly, another embodiment could comprise a plurality of fabrics (i.e., a plurality of fabric layers) and a corresponding plurality of fabric anchor assemblies (i.e., a separate anchor dedicated to each fabric layer), all contained within a single interior cavity. By virtue of the ability to easily disassemble the assembly by simply melting the castable material out of the interior cavity, a particular layer of fabric could be easily removed for repair or replacement.

It is, therefore, desired that it be understood that it is intended herein to cover all such modifications that fall within the true spirit and scope of this invention.

What is claimed is:

1. A product comprising a metal-fabric joint, said joint comprising:
   (a) a metal housing comprising an interior entrance, at least first and second opposed interior walls, and an interior end opposite said interior entrance, said at least first and second opposed interior walls and said interior end defining an interior cavity;
   (b) a fabric;
   (c) a fabric anchor assembly comprising a portion of said fabric and an anchor, said anchor assembly being located inside said interior cavity, such that said portion of said fabric is positioned inside said interior cavity; and
   (d) a castable material disposed in said interior cavity so as to envelop said portion of said fabric and said fabric anchor assembly,
wherein said castable material is a low melting point metal alloy.

2. The product according to claim 1, wherein said interior end of the metal housing is wider than said interior entrance of the metal housing.

3. A product comprising a metal-fabric joint, said joint comprising:
   (a) a metal housing comprising an interior entrance, at least first and second opposed interior walls, and an interior end opposite said interior entrance, said at least first and second opposed interior walls and said interior end defining an interior cavity;
   (b) a fabric;
   (c) a fabric anchor assembly comprising a portion of said fabric and an anchor, said anchor assembly being located inside said interior cavity, such that said portion of said fabric is positioned inside said interior cavity;
   (d) a castable material disposed in said interior cavity so as to envelop said portion of said fabric and said fabric anchor assembly, wherein said castable material is selected from the group consisting of a thermoplastic polymer and a low melting point alloy, and
a coating of rigidized thermoplastic adhesive disposed on each of said first and second opposed interior walls.

4. The product according to claim 3, wherein said castable material is a thermoplastic polymer.

5. A product comprising a metal-fabric joint, said joint comprising:
   (a) a metal housing comprising an interior entrance at least first and second opposed interior walls, and an interior end opposite said interior entrance, said at least first and second opposed interior walls and said interior end defining an interior cavity;
   (b) a fabric;
   (c) a fabric anchor assembly comprising a portion of said fabric and an anchor, said anchor assembly being located inside said interior cavity, such that said portion of said fabric is positioned inside said interior cavity;
   (d) a castable material disposed in said interior cavity so as to envelop said portion of said fabric and said fabric anchor assembly, wherein said castable material is selected from the group consisting of a thermoplastic polymer and a low melting point alloy, and
a flexible sealant disposed in a portion of said interior cavity located between said castable material and said interior entrance.

6. A product comprising a metal-fabric joint, said joint comprising:
   (a) a metal housing comprising an interior entrance, at least first and second opposed interior walls, and an interior end opposite said interior entrance, said at least first and second opposed interior walls and said interior end defining an interior cavity;
   (b) a fabric;
   (c) a fabric anchor assembly comprising a portion of said fabric and an anchor, said anchor assembly being located inside said interior cavity such that said portion of said fabric is positioned inside said interior cavity;
   (d) a castable material disposed in said interior cavity so as to envelop said portion of said fabric and said fabric anchor assembly wherein said castable material is selected from the group consisting of a thermoplastic polymer and a low melting point alloy, and
a bladder layer disposed so as to be contiguous with said fabric.

7. A product comprising a metal-fabric joint, said joint comprising:
   (a) a metal housing comprising an interior entrance, at least first and second opposed interior walls, and an interior end opposite said interior entrance, said at least first and second opposed interior walls and said interior end defining an interior cavity;
   (b) a fabric;
   (c) a fabric anchor assembly comprising an anchor and a means for attaching said fabric to said anchor, such that said fabric is at least partially disposed inside said interior cavity; and
   (d) a castable material disposed in said interior cavity so as to envelop said fabric at least partially disposed inside said interior cavity and said fabric anchor assembly, wherein said castable material is selected from the group consisting of a thermoplastic polymer and a low melting point alloy,
wherein said anchor is selected from the group consisting of a monofilament, a cable, and a wire.

8. A he method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity; (ii) a fabric; (iii) a fabric anchor assembly; and (iv) a castable material disposed in said interior cavity, wherein said castable material is selected from the group consisting of a thermoplastic polymer and a low melting point alloy, said method comprising the steps of:
(a) anchoring said fabric with said fabric anchor assembly;
(b) inserting said anchored fabric in said interior cavity whereby at least a portion of said fabric is disposed inside said interior cavity;
(c) providing said interior cavity with said castable material so as to envelop said anchored fabric;
(d) solidifying said castable material to form a cast material so as to provide said metal-fabric joint; and
(e) after said step (a) and before said step (b), a step of providing a coating of rigidizable thermoplastic adhesive disposed on each of said first and second opposed interior walls.

9. A method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity; (ii) a fabric; (iii) a fabric anchor assembly; and (iv) a castable material disposed in said interior cavity, wherein said castable material is selected from the group consisting of a thermoplastic polymer and a low melting point alloy, said method comprising the steps of:
(a) anchoring said fabric with said fabric anchor assembly;
(b) inserting said anchored fabric in said interior cavity, whereby at least a portion of said fabric is disposed inside said interior cavity;
(c) providing said interior cavity with said castable material so as to envelop said anchored fabric;
(d) solidifying said castable material to form a cast material so as to provide said metal-fabric joint; and
(e) after said step (c) and before said step (d), a step of providing a flexible sealant disposed in a portion of said interior cavity located between said castable material and said interior entrance.

10. A method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity; (ii) a fabric; (iii) a fabric anchor assembly; and (iv) a castable material disposed in said interior cavity, wherein said castable material is selected from the group consisting of a thermoplastic polymer and a low melting point alloy, said method comprising the steps of:
(a) anchoring said fabric with said fabric anchor assembly;
(b) inserting said anchored fabric in said interior cavity, whereby at least a portion of said fabric is disposed inside said interior cavity;
(c) providing said interior cavity with said castable material so as to envelop said anchored fabric;
(d) solidifying said castable material to form a cast material so as to provide said metal-fabric joint; and
(e) after said step (b) and before said step (c), a step of providing a bladder layer disposed so as to be contiguous with said fabric.

11. A method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity; (ii) a fabric comprising a first fabric portion and a second fabric portion; (iii) a fabric anchor assembly comprising an anchor and a means for attaching said fabric to said anchor; and (iv) a castable material disposed in said interior cavity, wherein said castable material is selected from the group consisting of a thermoplastic polymer and a low melting point metal alloy, said method comprising the steps of:
(a) folding said first fabric portion over said anchor, and folding said folded first fabric portion back against said second fabric portion;
(b) attaching said folded first fabric portion to said second fabric portion with said means for attaching so as to provide an anchored fabric;
(c) inserting said anchored fabric in said interior cavity, whereby said first fabric portion is positioned inside said interior cavity;
(d) providing said interior cavity with said castable material so as to envelop said anchored fabric; and
(e) solidifying said castable material to form a cast material so as to provide said metal-fabric joint.

12. A method according to claim 11, further comprising disassembling the metal-fabric joint by melting the castable material.

13. The method of claim 11, wherein the means for attaching comprises stitches.

14. A The method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity; (ii) a fabric; (iii) a fabric anchor assembly; and (iv) a castable material disposed in said interior cavity, wherein said castable material is selected from the group consisting of a thermoplastic polymer and a low melting point alloy, said method comprising the steps of:
(a) anchoring said fabric with said fabric anchor assembly;
(b) inserting said anchored fabric in said interior cavity, whereby at least a portion of said fabric is disposed inside said interior cavity;
(c) providing said interior cavity with said castable material so as to envelop said anchored fabric;
(d) solidifying said castable material to form a cast material so as to provide said metal-fabric joint; and
(e) disassembling the metal-fabric joint by melting the castable material.

15. A product comprising a metal-fabric joint, said joint comprising:
(a) a metal housing comprising an interior entrance, at least first and second opposed interior walls, and an interior end opposite said interior entrance, said at least first and second opposed interior walls and said interior end defining an interior cavity;
(b) a plurality of fabric layers;
(c) a fabric anchor assembly positioned inside said interior cavity, said fabric anchor assembly comprising a portion of each of said plurality of fabric layers and at least one anchor, wherein each of said plurality of fabric layers is attached to said fabric anchor assembly, such that said portions of said plurality of fabric layers are positioned inside said interior cavity; and (d) a castable material disposed in said interior cavity so as to envelop said portion of said plurality of fabric layers and said plurality of fabric anchor assemblies, wherein said fabric anchor assembly comprises a plurality of anchors equal in number to said plurality of fabric layers, wherein each of said plurality of fabric layers is attached to one of said plurality of anchors.

16. A method of fabricating a product comprising a metal-fabric joint, said joint comprising (i) a metal housing comprising an interior entrance, at least first and second opposed interior walls, and an interior end opposite said interior entrance, said at least first and second opposed interior walls and said interior end defining an interior cavity, wherein the interior end of the metal housing is wider than the interior entrance of the metal housing; (ii) a fabric comprising a first fabric portion and a second fabric portion; (iii) a fabric anchor assembly comprising an anchor and a means for attaching said fabric to said anchor; and (iv) a castable material disposed in said interior cavity, said method comprising the steps of:

(a) folding said first fabric portion over said anchor, and folding said folded first fabric portion back against said second fabric portion;

(b) attaching said folded first fabric portion to said second fabric portion with said means for attaching so as to provide an anchored fabric;

(c) inserting said anchored fabric in said interior cavity, whereby said first fabric portion is positioned inside said interior cavity;

(d) providing said interior cavity with said castable material so as to envelop said anchored fabric; and (e) solidifying said castable material to a cast material so as to provide said metal-fabric joint.

\* \* \* \* \*